J. EDSON & W. H. HAYNES.
Anti-Frictional Sheave for Pulley-Blocks.
No. 197,769. Patented Dec. 4, 1877.
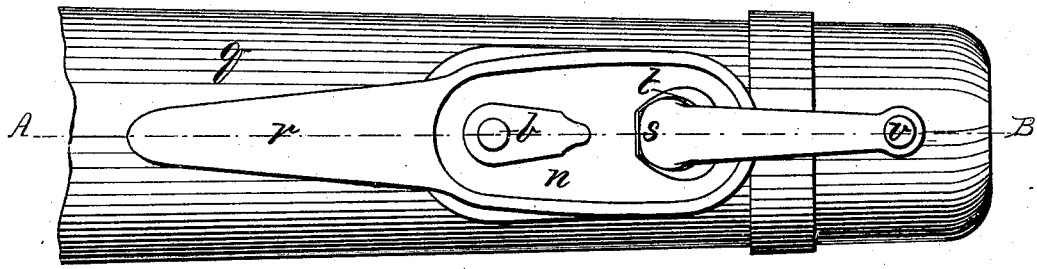
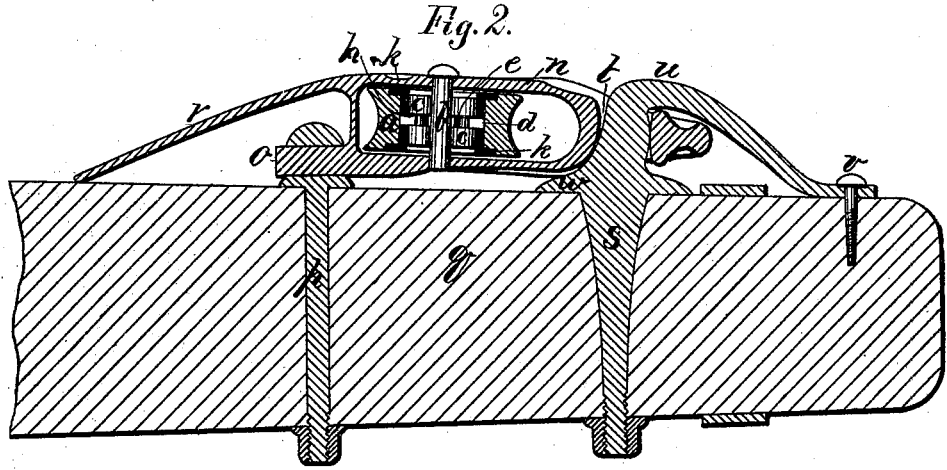
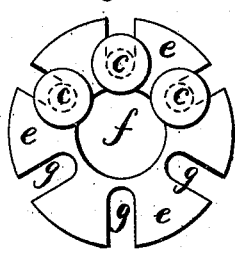
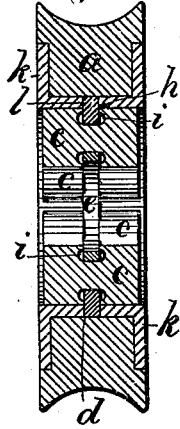
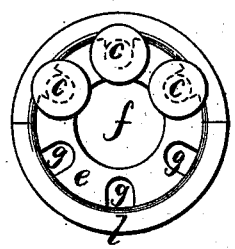
WITNESSES:
Henry Chadbourn.
F. Allen.
INVENTORS:
Jacob Edson
and
Warren H. Haynes
by Alban Andrew
their atty.

UNITED STATES PATENT OFFICE.

JACOB EDSON, OF BOSTON, AND WARREN H. HAYNES, OF SUDBURY, MASS.

IMPROVEMENT IN ANTI-FRICTIONAL SHEAVES FOR PULLEY-BLOCKS.

Specification forming part of Letters Patent No. 197,769, dated December 4, 1877; application filed October 6, 1877.

*To all whom it may concern:*

Be it known that we, JACOB EDSON, of Boston, in the county of Suffolk, and WARREN H. HAYNES, of Sudbury, in the county of Middlesex, all in the State of Massachusetts, have jointly invented certain new and useful Improvements in Anti-Frictional Sheaves, Bearings, Shaftings, Axles, &c.; and we do hereby declare that the following is a full, clear, and exact description thereof, which will enable others skilled in the art to which it appertains to make and use the same, reference being had to the accompanying drawings, and to letters of reference marked thereon, which form a part of this specification.

Our invention relates to improvements in anti-frictional and self-adjusting sheaves for looms, &c., and similar purposes; and this our invention consists, first, in arrangements for reducing a great deal of the friction in the bearing, which part of the invention is carried out as follows:

We employ around the central pin, shaft, or axle a suitable number of rollers, each of which is provided with one or more annular grooves for the reception of one or more regulators or guides, which latter are made with a suitable number of forked openings, in which the grooves on the rollers are rotated, by which the rollers are kept in their proper relative positions to each other at the same time as they are allowed a free motion to or from the central pin or axle during the rotation of the latter or the pulley.

The construction of this regulator may be modified as follows without departing from the spirit of our invention, namely: The regulator may be made so large as to project outside of the rollers, in which case that portion of the regulator that projects beyond the rollers is made to rotate into an annular groove made in the interior of the pulley or bearing, and if the anti-frictional device is used in the hub of a sheave or pulley we employ one or more annular rings, inserted from one or two opposite sides of the pulley, leaving a space between them, in which the regulator is to rotate. When the regulator is used on an anti-frictional bearing for a shaft or axle such bearing is made in two parts, with bolts and nuts, as usual, and provided with one or more grooves, into which one or more of the regulators are rotated.

The regulator may also be made as follows— that is to say, of such an outer diameter as not to project beyond the rollers, in which case an annular ring or track is made and secured within the pulley or bearing, which ring projects into the grooves that are made on the rollers; and it will be seen that one case is merely the reverse of the other—that is, in one instance the regulator projects into a groove in the pulley or bearing, and in the other an annular projection in the interior of the pulley or bearing projects within the grooves of the rollers. This annular ring may be cast or made in one piece with the bearing, or made in one or more independent parts, and held in position by means of one or two annular rings, as may be desired.

We provide the rollers with rounded annular recesses or chambers at each side of the groove at the junction of the central portion, by which the said rollers are very much strengthened, as compared with rollers having square-edged grooves. This manner of constructing the rollers is important to obtain good castings, that shall not require extra finish.

Our invention further consists of improvements in the sheave-case and connection to the boom, spar, &c., which is carried out as follows: The sheave-case is provided in one end with a pin or projection, supported within an eyebolt that is secured to the boom or spar, &c.; and the sheave is further provided in said end with a tail or protector, for the purpose of preventing the tangling of ropes, &c., and in its opposite end the sheave-case is provided with an eye fitting over the upper end of a bolt secured to the boom, spar, &c., in the usual manner. Said bolt, after passing up through the eye of the sheave-case, is curved backward, and its extreme outer end secured to the boom or spar, by which a strong and durable joint is obtained between the sheave and its boom, spar, &c., which at the same time allows of the desired rocking motion of the sheave. The head of this hook-bolt is provided with a cheek-piece running under the sheave-case, so as to prevent the sheave from turning too far around its axis.

On the accompanying drawings, Figure 1 represents a ground plan of our invention. Fig. 2 represents a central longitudinal section on the line A B, shown in Fig. 1. Fig. 3 represents a side view of a regulator with its rollers; and Fig. 4 represents a longitudinal section of a pulley having a modification of the regulator, of which a side view is shown in Fig. 5.

Similar letters refer to similar parts wherever they occur on the drawings.

$a$ in Fig. 2 represents a pulley, provided with a central pin, shaft, or axle, $b$, around which the rollers $c\ c\ c$ are located. A groove, $d$, is made within the pulley $a$, into which the regulator $e$ is fitting, a side view of which regulator is fully shown in Fig. 3. Said regulator is provided with a central opening, $f$, and, furthermore, with a number of forked slots, $g\ g\ g$, in which the grooved rollers are guided. Each roller is provided with one or more grooves, $h$, terminating as rounded recesses $i\ i$, (shown in Fig. 4,) for the purpose set forth. The groove $d$ in the pulley or bearing $a$ is formed by means of two annular rings, $k\ k$, inserted and secured from the opposite faces of the pulley, as shown in Fig. 2, leaving a space or groove, $d$, between them for the reception of the regulator $e$. One of these rings $k$ may be cast or made in one solid piece with the pulley, if so desired.

Fig. 5 shows a modification of our regulator, being made smaller in diameter than the one shown in Fig. 3, the rollers projecting outside of the former, in which case we use an annular interior ring, projection, or track, $l$, (shown in Fig. 4,) that projects into the grooves on the rollers. This projection, ring, or track $l$ may be made in one piece with the bearing, (if the latter is made in two parts,) or as a separate and independent ring, made solid or in halves, in which case it is secured by means of the annular flanged rings, one or more.

In Figs. 1 and 2, $n$ represents a sheave-case, provided in one end with a cylindrical pin or projection, $o$, fitting and resting in the eye-bolt $p$, secured in a suitable manner to the boom, spar $q$, &c., as shown.

$r$ represents the tail or protector, for the purpose set forth. $s$ represents a secondary bolt, secured to the boom $q$, which bolt projects upward through the open eye $t$ in the sheave-case $n$, and, after passing through said eye, is curved or hooked, as shown at $u$ in Fig. 2, and finally secured at $v$ to the boom or spar, &c., $q$, by which arrangement a very strong connection is made between the sheave and its boom or spar, at the same time as the sheave is allowed a free side-swinging motion in its peculiar bearings, and all tangling with ropes or sails is entirely obviated.

$w$ represents the cheek-piece at the head of the bolt $s$, projecting under the sheave-case, for the purpose set forth.

What we desire to secure by Letters Patent, and claim, is—

1. The combination, with a regulator, $e$, of the anti-frictional rollers $c\ c\ c$, provided with annular rounded chambers $i\ i$, as set forth.

2. The combination, with the sheave-case $n$ and its eye $t$, of the hooked holding-bolt $s\ u$, as herein described.

3. The combination, with the sheave-case $n$ and its eye $t$, of the holding-bolt $s\ u$, with its cheek-piece $w$, as set forth.

In testimony that we claim the foregoing as our own and joint invention we have affixed our signatures in presence of two witnesses.

JACOB EDSON.
WARREN H. HAYNES.

Witnesses:
ALBAN ANDRÉN,
HENRY CHADBOURN.